United States Patent [19]
Rosie

[11] Patent Number: 5,157,866
[45] Date of Patent: Oct. 27, 1992

[54] EARWIG COLLECTOR

[76] Inventor: James R. Rosie, 15175 Winston Churchill Blvd., Terra Cotta Ontario, Canada, L0P 1N0

[21] Appl. No.: 717,057

[22] Filed: Jun. 18, 1991

[51] Int. Cl.⁵ ............................................. A01M 1/00
[52] U.S. Cl. ........................................ 43/121; 43/107
[58] Field of Search ...................... 43/114, 121, 132.1, 43/131, 107

[56] References Cited

U.S. PATENT DOCUMENTS

| | | | |
|---|---|---|---|
| 1,048,479 | 12/1912 | Andel | 43/121 |
| 2,177,670 | 10/1939 | Peirson | 43/114 |
| 3,304,646 | 2/1967 | Staley | 43/114 |
| 3,341,967 | 9/1967 | Kelly | 43/121 |
| 4,227,333 | 10/1980 | Levinson et al. | 43/107 |
| 4,581,845 | 4/1986 | Burkholder et al. | 43/107 |

FOREIGN PATENT DOCUMENTS 2029779  5/1991  Canada ............................... 43/101

*Primary Examiner*—Richard K. Seidel
*Assistant Examiner*—Jeanne M. Elpel

[57] ABSTRACT

An apparatus for and a method of collecting and disposing of earwigs is disclosed. The earwig collector of the present invention provides snug relatively dark passageways for earwigs to collect in. The apparatus is typically made of wood, preferably cedar, in order to be more attractive to earwigs. Earwigs are removed from the passageways of the apparatus by separating the first and second body portions from one another thus exposing the earwigs that have collected in the passageways and knocking the first and second body portions against one another to jolt the earwigs therefrom. The earwigs preferably fall into a container of soapy water and drown.

19 Claims, 3 Drawing Sheets

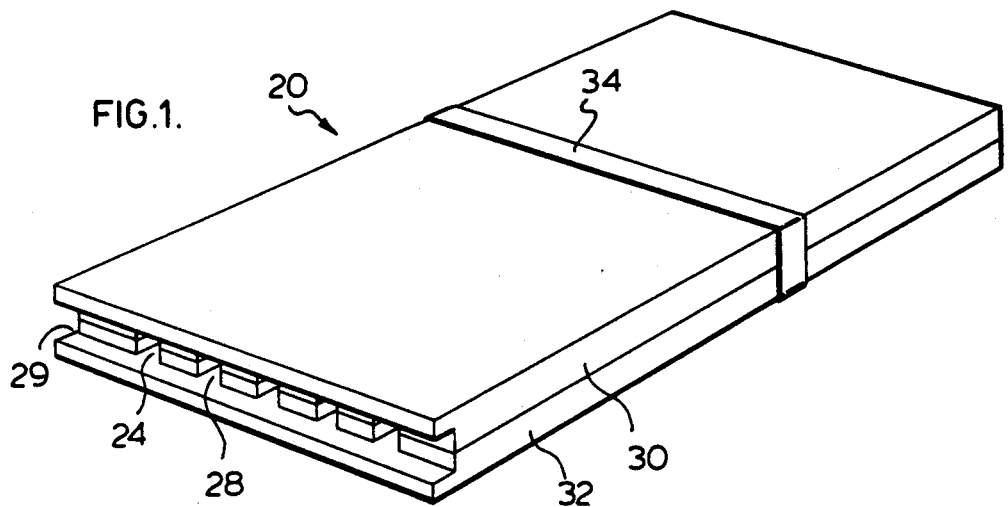
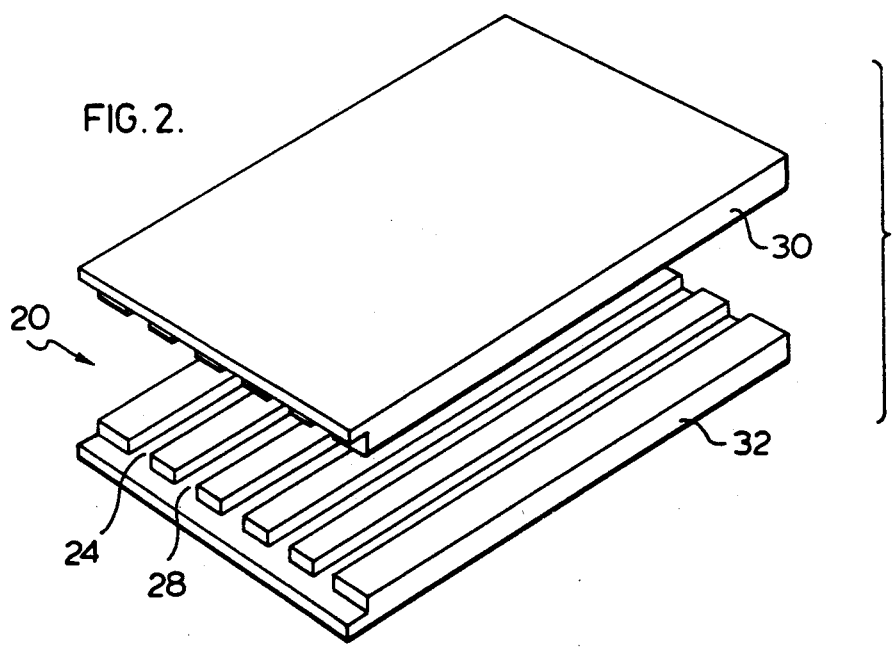

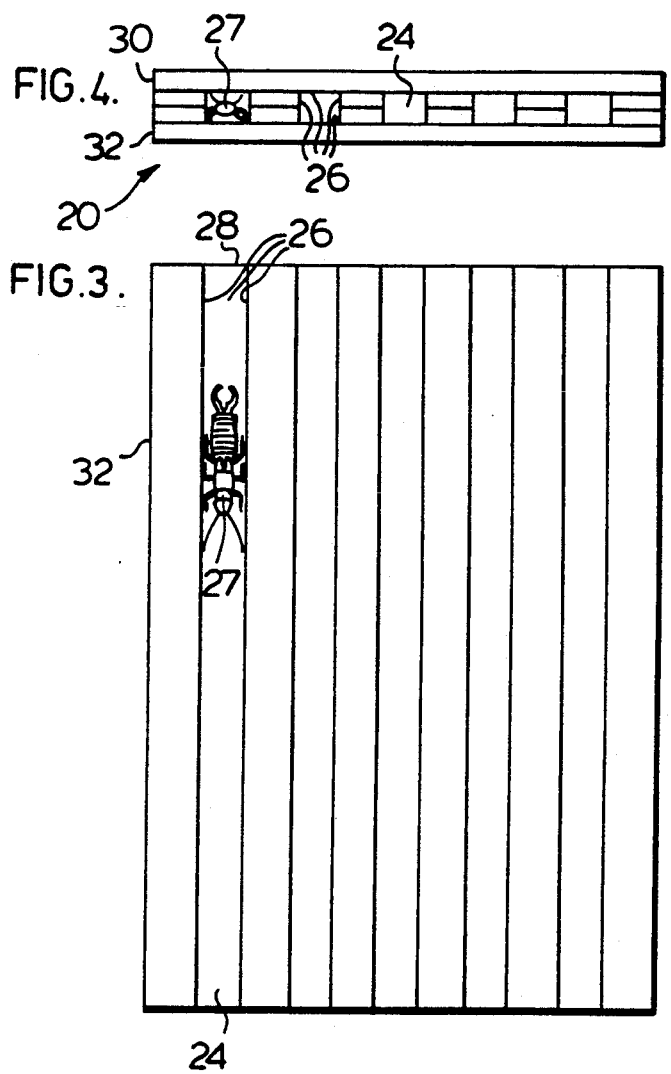
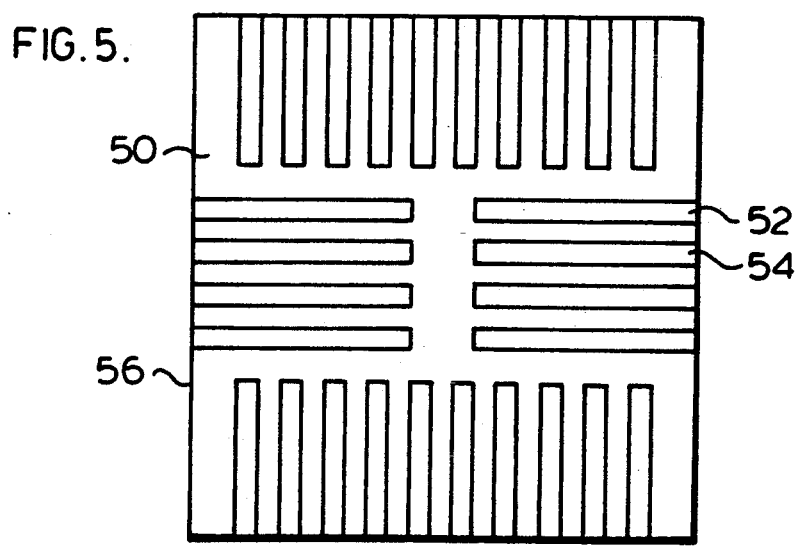

EARWIG COLLECTOR

FIELD OF THE INVENTION

This invention relates to the controlling of insect pests and more particularly to the collecting and disposal of such insect pests. Specifically, a method and apparatus for controlling and collecting earwigs is disclosed.

BACKGROUND OF THE INVENTION

Insects have been a part of nature and of the natural ecological system of the world for many millions of years. Many different species of insects can be found throughout the world, and indeed insects are found generally anywhere there is vegetation, among other places. It therefore follows that land over much of the world, including both populated and unpopulated areas, would be home to virtually all different types of insects. Resultingly, it is inevitable that the yard of a person's home would contain many different types of insects and probably very many of each type—indeed, possibly several thousand of some types.

It is desirable in a yard and in a garden to have different types of insects, for the purpose of maintaining a natural ecological balance within the yard or garden. Unfortunately, although this natural balance of nature generally works quite well, it is sometimes subject to extraneous influencing factors, thus causing an imbalance. Such an imbalance can be illustrated by a surplus or a shortage of any one particular type of insect, and can occur for a variety of reasons, including weather conditions, food supply, an excess or shortage of predators of a certain type of insect, and so on. Unfortunately, when any of these influencing factors change and cause an upset in this natural ecological balance, a shortage or an overabundance of one or more particular type of insect can occur. Especially in the case of an overabundance of one type of insect a problem can be created in a yard or garden—a virtual infestation of insects can potentially occur. This can create a problem that can include damage, even severe damage, to many types of plants, or at the very least will be the nuisance of having large quantities—perhaps several thousands—of the insects in a yard or garden, or even invading one's home.

Over the last several years, many geographical locations in North America have had an increasingly severe problem with earwigs. These insects are not native to North America and upon their arrival in North America some decades ago, they began to flourish as they have no natural enemies in North America. Indeed, in many places in North America today the earwig population is of excessive—and almost epidemic—proportions and is causing damage and general inconvenience to hundreds of thousands—if not millions—of yards and gardens.

Earwigs are one of the most common pests in North America and the general population of earwigs is believed to be on the increase. Indeed, a female earwig lays about 60 eggs in a season and with no natural enemies, most of the young survive, thus indicating that the earwig population could potentially grow at an alarming rate.

Earwigs are known to feed on common garden flowers such as carnations, marigolds, chrysanthemums and roses as well as common garden fruits and vegetables such as raspberries, beans, carrots, corn, lettuce and the like.

Obviously, in order to preclude—or at least lessen—the damage to one's yard or garden it is necessary to decrease such an overabundance of insects. Generally the only effective and acceptable way to decrease a large number of insects is to directly exterminate them. The most common way to exterminate insects, or at least deplete the size of an over abundant insect population, is to use chemicals, generally in the form of sprays or powders. Such chemicals, normally referred to as pesticides, can be sprayed in the air, either inside a home or outside, to kill flying insects, or can be sprayed onto vegetation to kill insects that more commonly remain on the ground or on vegetation. More natural methods, such as introducing predators, are often unacceptable if not possible.

In order to protect vegetation such as flowers, plants, and trees, it is quite common to spray such vegetation with pesticides so that any insects eating the vegetation would ingest the chemical and subsequently die. In the last few years, however, the use of pesticides to kill insects has become increasingly undesirable due to environmental concerns. It can also be somewhat costly since the pesticides may have to be reapplied frequently. Further, pesticides can also be detrimental to the health of humans and animals, and also can be injurious to some forms of vegetation. For these reasons, it is desirable to use means other than pesticides to exterminate insects.

It is especially undesirable to use pesticides to kill earwigs because earwigs are less effected by pesticides than are most other insects. Indeed, it is recommended that the pesticide used to kill earwigs have a concentration of about nine times that used for general purpose insect killing. Thus, the hazard to the environment, danger to humans, and harshness to plants is very substantially increased, therefore making the use of pesticides to kill earwigs very undesirable. Further, earwigs move freely about and the application of pesticide in a yard or garden is therefore only a temporary solution.

Due to the very large population of earwigs that is quickly increasing and the amount of damage that can be done by a large number of earwigs that might inhabit any yard or garden, it is highly desirable that earwigs generally be exterminated, preferably by a means other than pesticide use.

It is well known that earwigs rest during the day and forage at night when it is cooler and dark. An earwig's preferred resting place during the day is a place that is relatively snug—that is to say that the earwigs are in intimate contact with whatever is surrounding them—and also a place that is generally dark. It is also known that earwigs tend to congregate with their own species. It is quite common to find groups of earwigs of perhaps 20 or even 50 in number in one place—especially if that place provides an ideal snug and dark surrounding for the earwig. Preferably, a means for exterminating earwigs would include an earwig collector that would take advantage of the fact that earwigs prefer a snug dark place to rest in, and also would allow for the collection of several earwigs at a time.

DESCRIPTION OF THE PRIOR ART

The most common form of prior art is indeed chemical sprays—commonly called pesticides—and they are used almost universally in both commercial and household applications. Application of such pesticides works, however, only for a short period of time since the pesticide works most effectively only when there is direct contact of the sprayed pesticide with the earwig. Frequent re-application of pesticides is generally necessary.

Another form of prior art for collecting earwigs is the use of a normal piece of garden hose cut to a length of about 6 inches to 12 inches. The piece of garden hose is generally laid down on the ground so that earwigs will crawl into the interior of the hose in an attempt to find a cool dark place to rest or sleep.

Canadian Patent 349,660 to BABCOCK discloses an earwig hive for catching earwigs. The hive as disclosed is made of a sheet of green cedar bark rolled into a spiral. Pieces of cedar bark are placed in the spiral about an inch apart in order to keep the layers of the sheet of bark separated from one another around the spiral in order to have air space between the layers so that the layers may be exposed to air and dried. Once the sheet of green cedar bark is dried, the small pieces of cedar bark are removed. The resulting formation is a sheet rolled into a spiral; however, there are no small places for earwigs to crawl into and remain snugly therein. Further, removing the earwigs from inside the hive would be very difficult. Another shortcoming of the earwig hive disclosed in this patent is that it requires green bark from a cedar tree, which would harm or kill a cedar tree and would be expensive.

Canadian Patent 1,222,406 to BAKKE et al discloses a trap for insects that is specifically adapted for exterminating typographer bark beetles, and which comprises a tubular housing with a plurality of openings in the walls of the tubular housing. There are radially-projecting protrusions projecting outwardly from the tubular housing with openings between the protrusions. The insects crawl into the openings and into the tubular housing. They are attracted into the tubular housing by bait. Once inside the tubular housing they fall downwardly to the bottom thereof and into a collector bottle. The trap disclosed in this patent does not provide a snug dark place for earwigs to collect in. It is also quite sizable and obtrusive. Further, it has many parts and would be relatively expensive to produce.

U.S. Pat. No. 69,794 to SHEEHY discloses an insect trap having a central compartment inside a receptacle, wherein insects such as roaches crawl up a tunnel-like passage and into the central compartment and exit the central compartment through conduits and drop to the bottom of the receptacle from the ends of the conduits. The ends of the conduits are in mid-air within the receptacle and therefore the insects, cannot leave the receptacle and are therefore trapped therein. Again, the trap disclosed in this patent does not provide a snug dark place for earwigs to collect in. It is also quite sizable and obtrusive. Further, it has many parts and would be relatively expensive to produce.

Canadian Patent 356,406 to WEBB discloses an earwig trap having a plurality of layers with each layer having a plurality of elongated tapered openings into which earwigs can crawl. Between these layers of openings is a solid layer of wood. The openings are closed off at the opposite end of the trap. No portion of the trap can be separated from another portion in order to remove the earwigs which makes such removal difficult.

SUMMARY OF THE INVENTION

The present invention provides an earwig collector for collecting a large number of earwigs and subsequently disposing of them as desired. The earwig collector of the present invention comprises a first body portion and a second body portion joined together, preferably having a plurality of elongated passageways therein for earwigs to be collected in. The earwigs gain access into these passageways through apertures at one or both ends of each passageway. The passageways are preferably of a size only slightly bigger than the body of an earwig so that when an earwig is inside a passageway the earwig will be in intimate contact with the enclosing surfaces of the passageway. Further, the passageways are preferably elongated such that they are substantially dark inside when the apparatus of the present invention is exposed to light. It has been found that earwigs prefer to find a resting place that is relatively snug—that is to say that there is a surface generally surrounding and touching them—and also a place that is generally dark.

The apparatus of the present invention preferably comprises a first body portion and a second body portion, wherein the two body portions join together to form the earwig collector. In use, the two body portions are joined snugly together in order to form the relatively dark passageways necessary for earwig collection. The first body portion and the second body portion are separable one from the other in order to gain access to the earwigs in the passageways.

In use, the first and second body portions are joined tightly together, typically by an elastic, to preclude them from separating. The earwig is placed in a yard or garden, or wherever appropriate, in order to collect earwigs. Preferably, the collector is placed such that passageways therein are orientated vertically to make it more difficult for the earwigs to crawl out.

To remove the earwigs that are within the passageways, the two body portions are merely separated and knocked together and the earwigs are jolted out of the exposed passageways. Preferably, the earwigs are then dropped into a container of soapy water where they drown. If water is used without soap, the earwigs can easily land on top of the water and the surface tension of the water is sufficient to keep them from actually entering into the water. The earwigs then can crawl out of the container. With soap dissolved in the water, the surface tension is substantially reduced and the earwigs enter into the water and drown.

Accordingly, the present invention provides an earwig collector, comprising a first body portion and a second body portion, wherein the first and second body portions are separably attached one to the other to form the earwig collector. There is at least one passageway in the earwig collector, with the passageway being defined by an enclosing surface and being generally exposed when said first and second body portions are separated one from the other, and also having an aperture at the exterior of the earwig collector, the aperture being in communication with the passageway. Further, the passageway is sized so as to snugly contain an earwig therein.

Moreover, a method for collecting and disposing of earwigs comprising the following steps:
(1) positioning an earwig collector on a supporting surface with the earwig collection including: A first body portion and a second body portion, wherein the first and second body portions are separably attached one to the other to form the earwig collector; a passageway in said earwig collector, with the passageway being defined by an enclosing surface, and being generally exposed when said first and second body portions are separated one from the other, and also having an aperture at the exterior of said earwig collector, the aperture being in communication with the passageway, wherein the passageway is sized so as to snugly contain an earwig therein;

(2) allowing said earwig collector to collect earwigs in said passageways; and (3) separating said first and second body portions from one another and removing said earwigs from said passageways.

BRIEF DESCRIPTION OF THE DRAWINGS

Embodiments of this invention will now be described by way of example in association with the accompanying drawings in which:

FIG. 1 is an isometric view of the earwig collector of the present invention;

FIG. 2 is an isometric view of the earwig collector as shown in FIG. 1, with the two halves separated;

FIG. 3 is a top view of the inside of one of the halves;

FIG. 4 is an end view of the earwig collector, showing an earwig in one of the passageways;

FIG. 5 is a top view of one of the halves of an alternative embodiment;

DETAILED DESCRIPTION OF THE PREFERRED EMBODIMENTS

Figure 6:
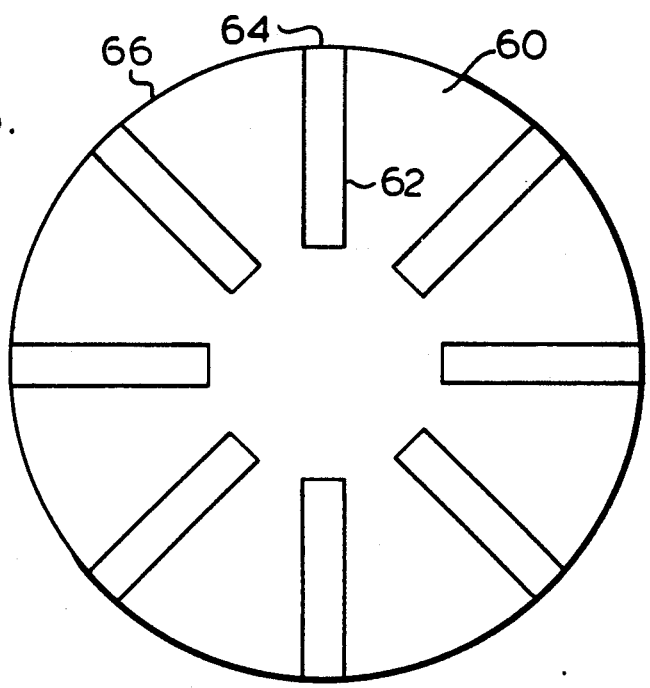
FIG. 6 is a top view of one of the halves of a further alternative embodiment.

Reference will now be made to FIGS. 1 to 4, which show the earwig collector 20 of the present invention. The earwig collector 20 has a plurality of elongated passageways 24 therein. The passageways 24 are each defined by at least one enclosing surface 26.

The earwig collector 20 has a plurality of apertures 28 in the exterior thereof, each aperture leading into a corresponding passageway 24. Preferably, the passageways 24 extend the entire length of the earwig collector 20 and have one aperture 28 at each end thereof. The passageways 24 are preferably of a constant cross-sectional area and shape and the corresponding apertures 28 are generally of the same cross-sectional area and shape.

As can be best seen in FIG. 4, the preferred cross-sectional shape of the passageways 24 is square, or at least rectangular, but this is largely for manufacturing purposes. It is believed that other cross-sectional shapes such as circular, octagonal, or possibly even some irregular shapes, would also work.

In the case of a square cross-sectional shape, the enclosing surface 26 is in the form of four separate surfaces per passageway. In the case of a circular cross-sectional shape, the enclosing surface 26 is in the form of one separate surface.

The size of the passageways 24 across the cross-section thereof is quite important. It has been found that the preferred size for square cross-sectionally shaped passageways is one-eighth inch with a size between one-sixteenth inch and one-quarter inch being acceptable. Passageways of this size allow earwigs to readily enter therein and also provide a reasonably "snug" passageway wherein earwigs are generally in intimate contact with the enclosing surface 26 of the passageway 24. It can be seen that the earwig 27 generally occupies most of the cross-sectional area of the passageway 24 and that the earwig 27 is generally in contact with the enclosing surface 26 of the passageway 24. Further, it is important that the passageways 24 be relatively dark inside even when the earwig collector 20 is exposed to sunlight. This is accomplished by having a relatively small cross-sectional area for the passageways 24, and also having the passageways substantially elongated.

There is a laterally displaced slot 29 at one end of the earwig collector 20. This slot allows for earwigs to more readily have access to the passageways 24 when the earwig collector 20 is oriented in an upright orientation, with the slot 29 at the bottom thereof. The earwigs would first enter the slot and then travel into a passageway. Such a slot could be included on one or both ends.

The earwig collector 20 is made up of a first body portion 30 and a second body portion 32. The two body portions 30 and 32 are held tightly together, typically by an elastic band 34, to form the earwig collector 20. In the preferred embodiment, the first body portion 30 and the second body portion 32 are mirror images of one another at least as far as the passageways are concerned. It is important that when the first body portion 30 and the second body portion 32 are joined together to form the earwig collector 20, the portions of the passageways 24 found in one of the body portions align properly with the corresponding portions of the passageways 24 found in the other body portion.

In the preferred embodiment, the passageways 24 are symmetrical from one side to the other and are straight along the length of the body portions 30, 32—which means they are symmetrical from end to end. As far as manufacturing purposes go this means that only one actual form need be manufactured and it can serve as both the first body portion 30 and the second body portion 32.

Further, since the earwig collector 20 separates into a first body portion and a second body portion such that the passageways 24 are partly in each body portion then when the two body portions are separated any earwigs caught therein will be more exposed and more easy to remove.

It has been found that if each of the first and second body portions 30, 32 are about one-half inch thick, and about 3 to 4 inches wide, they are very easy to handle and manipulate.

In use, the earwig collector 20 is placed in a yard or garden in either a flat orientation or an upright orientation whereby the passageways 24 are orientated generally vertically. The earwig collector 20 is left this way during the day when earwigs are typically looking for a place to "hide" so that they may sleep. Earwigs prefer to sleep in a location that is fairly snug—that is to say that there is a surface generally surrounding and touching the earwigs—and also in a location that is fairly dark. Once the earwigs crawl into the collector they will remain there until night time when they will crawl out of the collector and forage upon any number of types of plants. In order to remove the earwigs from the earwig collector 20 it is necessary to pick up the earwig collector 20, remove the elastic band 34 that holds the first body portion 30 and the second body portion 32 together, grasp the first body portion 30 in one hand and the grasp the second body portion 32 in the other hand, separate the two body portions from one another, and knock them together to jolt the earwigs from the passageways 24. It is also possible to use a brush, preferably a relatively soft brush, to assist in the removal of earwigs from the passageways. It has been found that a common basting brush or a paint brush are each suitable for removing earwigs.

In order to then kill the earwigs, it is preferable to have them drop into a pail of soapy water, or other suitable liquid, so that they will drown. Using soap with water reduces the surface tension of the water and permits the earwigs to enter into the water and drown, as opposed to remaining on the surface and crawling out of the container.

In the above described manner, it is quite easy to empty the earwig collector 20 of earwigs without actually touching them.

The earwig collector 20 may be made of a number of different materials; however, it has been found that wood, especially cedar, is useful in attracting earwigs. It is believed that the earwigs are attracted by the scent of the wood. Further, wood placed outside tends to become and remain slightly damp, which is also believed to be attractive to earwigs.

It is possible to manufacture the earwig collector 20 from wood particles, either large particles such as wood chips or very small particles such as sawdust, with the particles being held together by an adhesive of some sort.

It is also possible to manufacture the earwig collector 20 of the present invention from materials such as plastic, which may be more practical and economical for large scale production methods such as injection molding—or even extruding if possible.

FIG. 5 shows an alternative embodiment of the invention, having a first body portion 50 and a second body portion (not shown) with a plurality of passageways 52. Each passageway 52 has an aperture 54 in the exterior 56 of the collector, which leads into the passageway 52. The passageways 52 are each somewhat elongated, but not as elongated as the passageways in the preferred embodiment. This embodiment allows for a greater number of passageways and correspondingly a greater number of apertures 54 for the earwigs to enter.

FIG. 6 shows an alternative embodiment that is based on a similar principal to the embodiment shown in FIG. 5, except circular in shape. Again, there is a first body portion 60 and a second body portion (not shown), with a plurality of radially displaced and inwardly directed passageways 62 therein, each passageway having an aperture 64 in the exterior 66 of the collector, which leads into the passageway 52.

Figure 7:
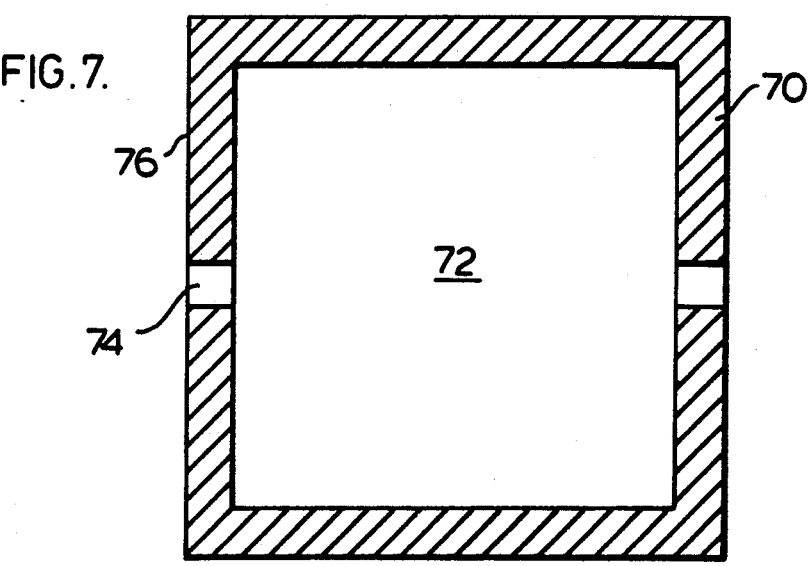
FIG. 7 is a top view of one of the halves of yet another alternative embodiment.

FIG. 7 shows a further alternative embodiment of the invention, having a first body portion 70 and a second body portion (not shown), with a single chamber 72 and a passageway 74 leading from the exterior 76 of the collector into the chamber 72. Although this embodiment does not provide the same snug quarters for earwigs, it does provide a passageway that is quite dark or at least has quite dark portions.

Figure 8:
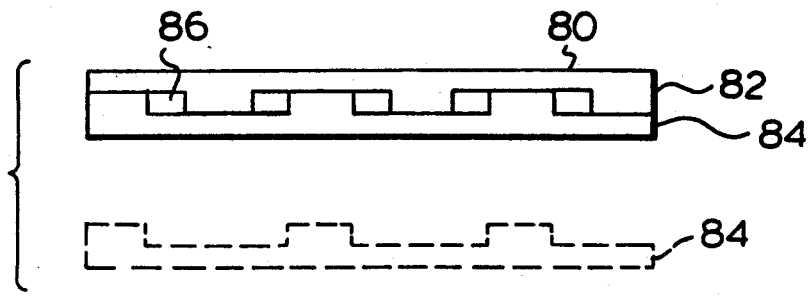
FIG. 8 is an end view of an alternative embodiment that is very similar to the preferred embodiment, with a portion thereof shown duplicated in ghost outline.

FIG. 8 shows the same basic embodiment as the preferred embodiment, however, the earwig collector 80 is separated into a first body portion 82 and a second body portion 84 in a slightly different manner. The second body portion 84 is shown a second time in ghost outline. It can be seen that when the first and second body portions 82, 84 are separated one from the other, two of four surfaces that define the enclosing surface of the passageway 86 are separated from the other two surfaces. It can be seen that such a configuration makes it easy for the earwigs to be removed from the passageways 86.

Other modifications and alterations may be used in the design and manufacture of the earwig collector of the present invention without departing from the spirit and scope of the accompanying claims.

I claim:

1. An earwig collector, consisting of:
a first body portion;
a second body portion;
means for securing said first and second body portions together;
wherein said first and second body portions are identical and separably attached one to the other by said means for securing to form said earwig collector;
at least one passageway in said earwig collector;
said at least one passageway being defined by enclosing surfaces that are found partially in said first body portion and that are found partially in said second body portion, and said at least one passageway being generally exposed when said first and second body portions are separated one from the other;
at least one aperture at the exterior of said earwig collector, said aperture being in communication with said at least one passageway, and generally forming an end of said at least one passageway;
and wherein said at least one passageway is from one-sixteenth inch to one-quarter inch across so as to snugly contain an earwig therein.

2. The earwig collector of claim 1, wherein said at least one passageway is substantially dark when said aperture is generally exposed to light.

3. The earwig collector of claim 1, having a plurality of passageways therein.

4. The earwig collector of claim 1, wherein said at least one passageway extends through said earwig collector and is in communication with an aperture at each end thereof.

5. The earwig collector of claim 1, wherein said at least one passageway is elongated.

6. The earwig collector of claim 1, wherein said at least one passageway is of generally constant cross-section along its length.

7. The earwig collector of claim 1, wherein said at least one passageway is in part within said first body portion and in part within said second body portion.

8. The earwig collector of claim 1, wherein said at least one passageway is substantially rectangular in cross-sectional shape.

9. The earwig collector of claim 8, wherein said at least one passageway is substantially square in cross-sectional shape.

10. The earwig collector of claim 1, wherein said at least one passageway is approximately one-eighth inch across.

11. The earwig collector of claim 1, wherein said earwig collector is made of wood.

12. The earwig collector of claim 11, wherein said earwig collector is made of cedar.

13. The earwig collector of claim 11, wherein said earwig collector is made of wood particles held together by a suitable adhesive.

14. The earwig collector of claim 1, wherein said earwig collector is made of plastic.

15. The earwig collector of claim 14, wherein said earwig collector is made from an extrusion process.

16. A method for collecting and disposing of earwigs comprising the following steps:
- positioning an earwig collector on a supporting surface, said earwig collector consisting of a first body portion and a second body portion, and a means for securing, wherein said first and second body portions are identical and separably attached one to the other by said means for securing, to form said earwig collector;
- at least one passageway in said earwig collector, said at least one passageway being defined by enclosing surfaces that are found partially in said first body portion and that are found partially in said second body portion, and said at least one passageway being generally exposed when said first and second body portions are separated one from the other, with at least one aperture at the exterior of said earwig collector, said aperture being in communication with said at least one passageway, and generally forming an end of said at least one passageway, wherein said at least one passageway is from one-sixteenth inch to one-quarter inch across so as to snugly contain an earwig therein;
- allowing said earwig collector to collect earwigs in said passageways; and
- separating said first and second body portions from one another and removing said earwigs from said passageways.

17. The method of claim 16, wherein said earwigs are removed from said earwig collector by knocking said first body portion against said second body portion.

18. The method of claim 16, wherein said earwigs are removed into a container of liquid, said liquid adapted to drown said earwigs.

19. The method of claim 18, wherein said liquid is soapy water.

* * * * *